United States Patent [19]

Rosenberg et al.

[11] Patent Number: 4,953,412
[45] Date of Patent: Sep. 4, 1990

[54] PIPELINE CALIPER PIG

[75] Inventors: Jeffrey S. Rosenberg; Kevin W. Lockyear, both of Tulsa, Okla.

[73] Assignee: T. D. Williamson, Inc., Tulsa, Okla.

[21] Appl. No.: 822,755

[22] Filed: Jan. 17, 1986

[51] Int. Cl.$^5$ .............................................. G01B 5/00
[52] U.S. Cl. .................................. 73/865.8; 73/866.5; 33/544; 33/777
[58] Field of Search ............. 73/432 G, 432 B, 432 R, 73/432.1, 865.8, 866.5; 33/141 G, 302, 544, 1 H, 542, 125 R, 125 B, 777

[56] References Cited

U.S. PATENT DOCUMENTS

| | | | |
|---|---|---|---|
| 2,619,728 | 12/1952 | Ely | 33/1 H |
| 2,834,113 | 5/1958 | en Dean et al. | 73/40.5 R |
| 3,718,978 | 3/1973 | Van Koevering et al. | 138/97 X |
| 3,755,908 | 9/1973 | VerNooy | 33/178 F |
| 3,789,511 | 2/1974 | Groom et al. | 33/542 X |
| 3,857,182 | 12/1974 | Van Riemsdijk et al. | 33/141 G |
| 3,882,606 | 5/1975 | Kaenel et al. | 33/141 G X |
| 3,940,855 | 3/1976 | Ver Nooy et al. | 33/178 F X |
| 3,968,568 | 7/1976 | Jackson | 33/141 G |
| 4,342,225 | 8/1982 | Jandera et al. | 73/432 G |
| 4,457,073 | 7/1984 | Payne | 73/432 G X |
| 4,459,759 | 7/1984 | Hulsing, II | 33/302 X |
| 4,524,526 | 6/1985 | Levine | 33/302 X |

Primary Examiner—Tom Noland
Attorney, Agent, or Firm—Head and Johnson

[57] ABSTRACT

An improved pipeline caliper pig for providing a record of the deviations of the interior wall of a pipeline including a pig body assembly having a longitudinal axis and support members so that the pig body assembly is supported within a pipeline, the support members impeding the flow of fluid therepast so that the pig body is propelled by fluid flow along the pipeline interior, an integrator plate carried by the pig body assembly, arms extending from the pig body assembly for responding to deviations in the interior wall of the pipeline and coupling members to transfer the deviations to the integrator plate, a plurality of axially positionable shafts affixed at one end to the integrator plate, and electrical transducers at the other end of each shaft so that movement of the integrator plate relative to the pig body is transmitted into electrical signals, an orientation detection member and a signal receiver and recorder to record the electrical signals of the transducers and the orientation detection member so that deviations in the interior wall of the pipeline and the orientations of such deviations relative to the vertical are recorded as electrical signals, the recorded signals being recoverable whereby the pipeline operator can be advised of the conditions of the inside wall of a pipeline through which the caliper pig has passed. An alternate embodiment includes the use of three odometer wheels producing electrical signals responsive to the rotation thereof providing indications of curves, bends, dips and rises in the pipeline.

15 Claims, 9 Drawing Sheets

PIPELINE CALIPER PIG

BACKGROUND AND SUMMARY OF THE INVENTION

During installation of pipelines they can often be dented or buckled as a result of construction activity, such as during the backfilling the ditch in which they are laid and so forth. After pipelines have been installed they still are subject to becoming damaged due to the effect of temperature changes causing stretching and buckling, freezing and thawing of the earth, shifting in the earth's structure, damage from other construction activities, and so forth. In addition, debris can gather in certain areas in a pipeline forming an obstruction to the flow of fluid therethrough. For these and other reasons, a technique which has been employed in the pipeline industry to determine the character of the internal pipeline wall is to pass a caliper pig through the pipeline. The caliper pig was invented by Burton VerNooy, patentee of U.S. Pat. No. 3,755,908 entitled "Pipeline Pig". The pipeline pig of the VerNooy invention includes a body assembly with spaced apart cups affixed to the body. The cups form the dual function of supporting the body in the pipeline and at least one of the cups interfere with the fluid flow through the pipeline so that the pig is carried along by the fluid flow. Attached to the body are a plurality of arms which extend out to engage the interior of the rearward cup. Coupling members extend from the arms to an integrator plate which is attached to an axially positionable central shaft. Within the pig body is an instrument package providing a moving chart. A pen stylus is affixed to the inner end of the shaft.

As the pipeline pig of the VerNooy patent passes through a pipeline and encounters a deflection of the inner pipeline wall, the cup is deformed and thereby one or more of the finger mechanisms is deflected. This deflection is transmitted to the integrator plate which causes the axial shaft to be displaced. The shaft displacement is indicated on the chart. By means of an odometer system the chart is moved in proportion to the travel of the pig through the pipeline so that after the chart has been recovered following a complete run of a pig, the extent of and the location of a deviation in the pipeline wall is indicated.

While the pipeline pig of U.S. Pat. No. 3,755,908 works exceedingly well and has proven to be a great boom to the operators of pipelines in the United States and many parts of the world, nevertheless, it has some deficiencies. A primary deficiency of the pipeline pig as disclosed in U.S. Pat. No. 3,755,908 is that when an anomoly in the interior wall of a pipeline is detected it is recorded in the same manner on the chart regardless of the axial orientation of the anomoly. For instance, if an interior protrusion occurs in a pipeline it will be indicated and the depth of the protrusion and its location along the length of the pipeline will be indicated; however, the axial orientation is not indicated, that is, whether the indentation is at the top, bottom or sides of the pipeline is not known to the operator. Further, the moving paper chart must move at a relatively slow rate to permit a pipeline pig to travel several miles within a pipeline, therefore, the characteristics of anomolies which are detected can not be easily determined from the paper chart.

The present invention overcomes these problems associated with the presently known caliper pigs represented by U.S. Pat. No. 3,755,908. The invention provides an improved caliper pig, which, among other advantages, produces a rotationally oriented signal detection system so that the record provides not only the location and depth of a protrusion, as an example, but also the axial orientation thereof relative to the vertical. In addition, means is provided for greatly improving the quality of the records so that more information is provided as to the size and shape of any anomoly detected in the interior pipeline wall.

To accomplish these goals the present invention includes a pig body assembly having a longitudinal axis. Means is provided in the form of spaced apart cups of resilient material for supporting the pig body within the pipeline. At least one of the cups is impervious to fluid flow, that is, impedes fluid flow so that the pig is moved through the pipeline interior by the flow of fluid. Contained within the body assembly is a closed instrument package and batteries.

Affixed to the pig body assembly in conjunction with the rearward most resilient cup is an integrator plate. Extending from the integrator body assembly are a plurality of spaced apart fingers, each hinged at its inner end to the pig body assembly. The outer ends engaging the cup to thereby deflect in conformity with the deflection of the cup. The movement of the fingers are each individually conveyed to the integrator plate by means of coupling members extending from the fingers to the periphery of the integrator plate.

At least three shafts are connected to the integrator plate, the axis of each of the shafts being parallel to the longitudinal axis of the pig body assembly. In the preferred arrangement one of the shafts is a central shaft, the axis of which is coincident with the body longitudinal axis with the other two shafts being spaced from the central shaft and spaced from each other, such as 120° apart, as an example.

Affixed to the inner end of each of the shafts is an electrical transducer, that is, an element which transforms the axial displacement of each of the shafts into an electrical signal. This is accomplished by means of a rotary potentiometer each having a short shaft extending therefrom with a crank arm extending from it. Each of the shafts connected to the integrator plate are provided with a follower which engages a potentiometer crank arm. As the integrator plate is pivoted in response to changes in the internal configuration of a pipeline wall the displacement of the shafts are transformed into electrical signals.

An odometer system is employed to provide a signal in response to the movement of the pig through the pipeline. The odometer system preferably employs two odometer wheels each of which provides an electrical signal indicating its rotation, the odometer wheels being resiliently biased against the interior of the pipeline. The signals are fed to an instrument package which also receives the signals from the transducers connected to the shafts extending from the integrator plate. In addition, a gravitationally sensitive indicator is carried by the body assembly and provides electrical signals indicating the orientation of the pig body relative to the vertical. The orientation signals when coordinated with the signals produced by the three shafts extending from the integrator plate provide means of indicating the position relative to the vertical of an internal deflection of the pipeline wall while the signals provided by the odometer system identifies the position of the internal deflection relative to the length of the pipeline.

An alternate embodiment of the invention provides means for detecting and recording changes in the direction of a pipeline, such as curves, bends, dips and rises. For this purpose three or more odometer wheels are secured to the pig body assembly arranged in a common plane perpendicular to the body assembly longitudinal axis and spaced in equal angular relationship. When three odometer wheels are employed they are spaced 120° apart.

Each odometer wheel includes a means of producing an electrical signal indicative of the rotation of the wheel, such as one pulse per revolution. These signals are fed to the electronic package where the signals are stored along with the other signals, such as those from the orientation card. Upon completion of a run of the pig the recorded signals may be employed in a computer, utilizing an appropriate program, to provide a record of the changes in direction of the pipeline, which changes can be coordinated with the detected changes in orientation of the pig relative to the vertical so that the final record will reveal curves to the left or right or inclines or decline of the pipeline. Such detected changes in direction of a pipeline when coordinated with recorded distance measuring odometer signals help to more precisely identify the location of a detected deviation in the pipeline wall so that the operator will know more precisely where to uncover the pipeline for external visual inspection of a problem area.

More details of the invention will be set forth in the attached description and claims, including the attached drawings.

DESCRIPTION OF THE PREFERRED EMBODIMENT

Figure 1:
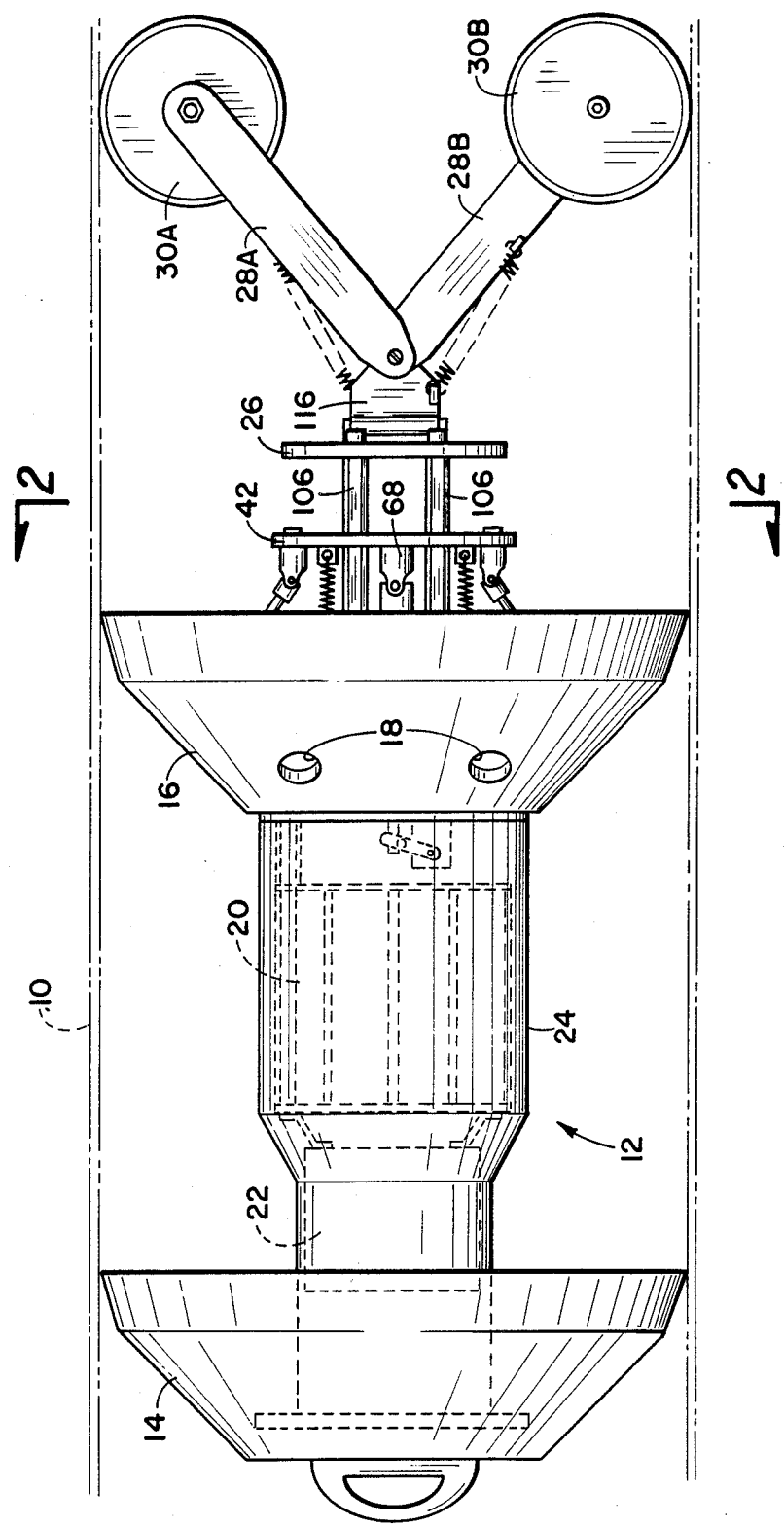
FIG. 1 is an elevational view of one embodiment of the improved pipeline caliper pig of this invention shown mounted inside of a pipeline as it would appear in use.

Referring to the drawings and first to FIG. 1 the improved caliper pig of this invention is shown in elevational view within the interior of a pipeline, the pipeline being indicated by the numeral 10. The caliper pig includes a longitudinal pig body assembly generally indicated by the numeral 12 with a forward cup 14 and a rearward cup 16. The cups support the pig body assembly 12 centrally within the pipeline 10. One of the cups, and preferably forward cup 14, is impervious to fluid flow so that when the pig is inserted in a pipeline the flow of fluid moves the pig through it. Rearward cup 16 may be impervious to fluid flow or may have holes 18 therein as illustrated so as to balance pressure across the rearward cup and to allow the force of fluid flow to be applied entirely against the forward cup 16.

The pig includes an electronics package indicated in dotted outline and identified by the numeral 20 which consists of circuit boards having the necessary electrical items for processing electrical signals, including an electronic clock. The electronics package includes circuits for treating electrical signals and for storage of information for subsequent use. While the electronics 20 may include a variety of different ways of handling and storing the electrical signals necessary to provide a report as to the characteristics of the interior of the pipeline 10 through which the pig has passed, the preferred arrangement includes the use of digital signal handling capabilities in which the information is stored in solid state memory. Batteries 22 provide the electrical energy for the operation of the electronics 20. The pig body assembly 12 includes a sealed housing 24 which, when secured in place on the pig body assembly, protects electronics 20 and batteries 22 from the fluid or gas content of the interior of pipeline 10.

Extending rearwardly from the pig body assembly is a subframe 26 which supports arms 28A and 28B which have odometer wheels 30A and 30B rotatably positioned at the outer ends thereof. The function of the odometer wheels 30A and 30B is to provide a signal utilized by electronics 20 to indicate on the record the distance the pig has traveled through pipeline 10.

Figure 2:
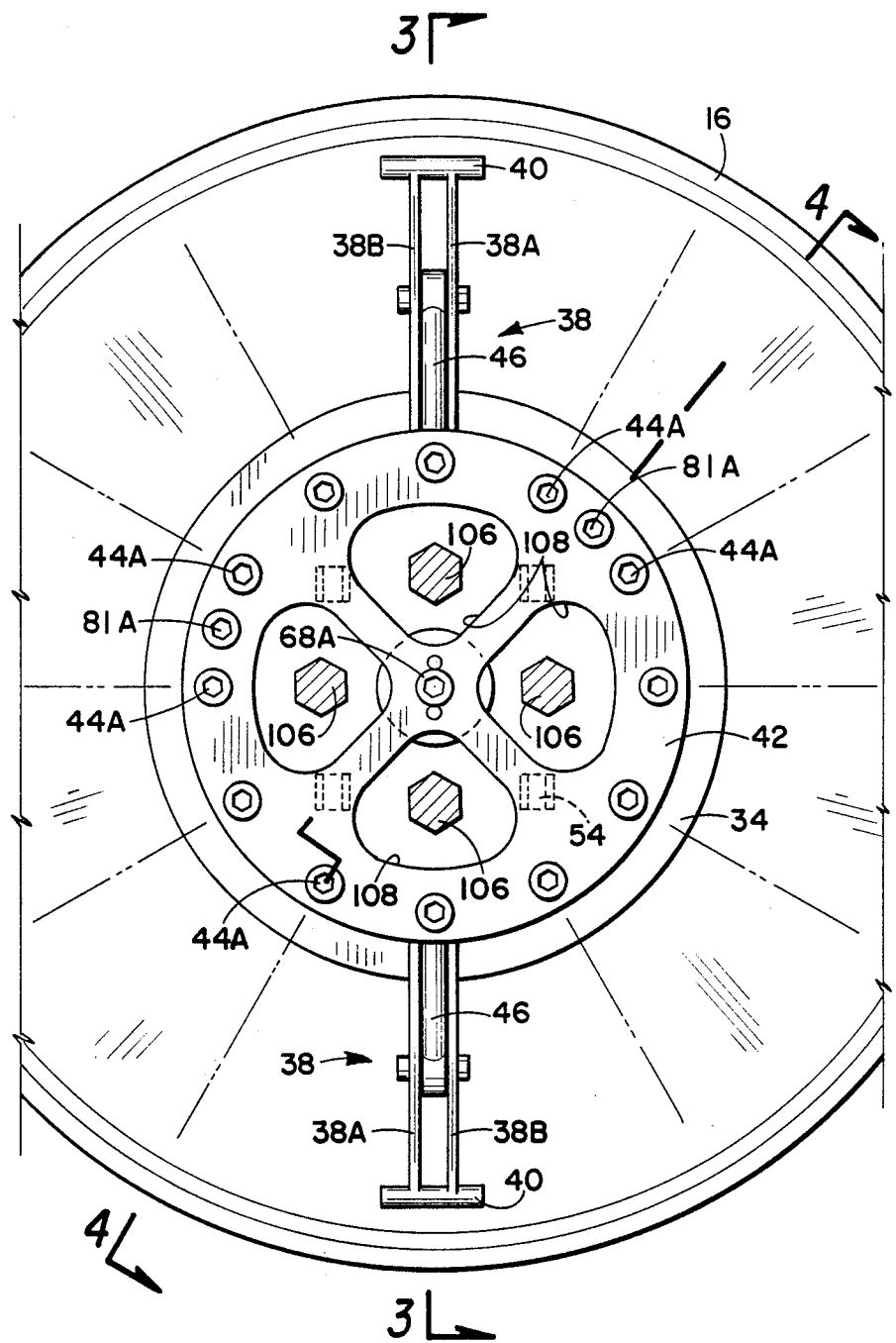
FIG. 2 is a cross-sectional view taken along the line 2—2 of FIG. 1.
Figure 3:
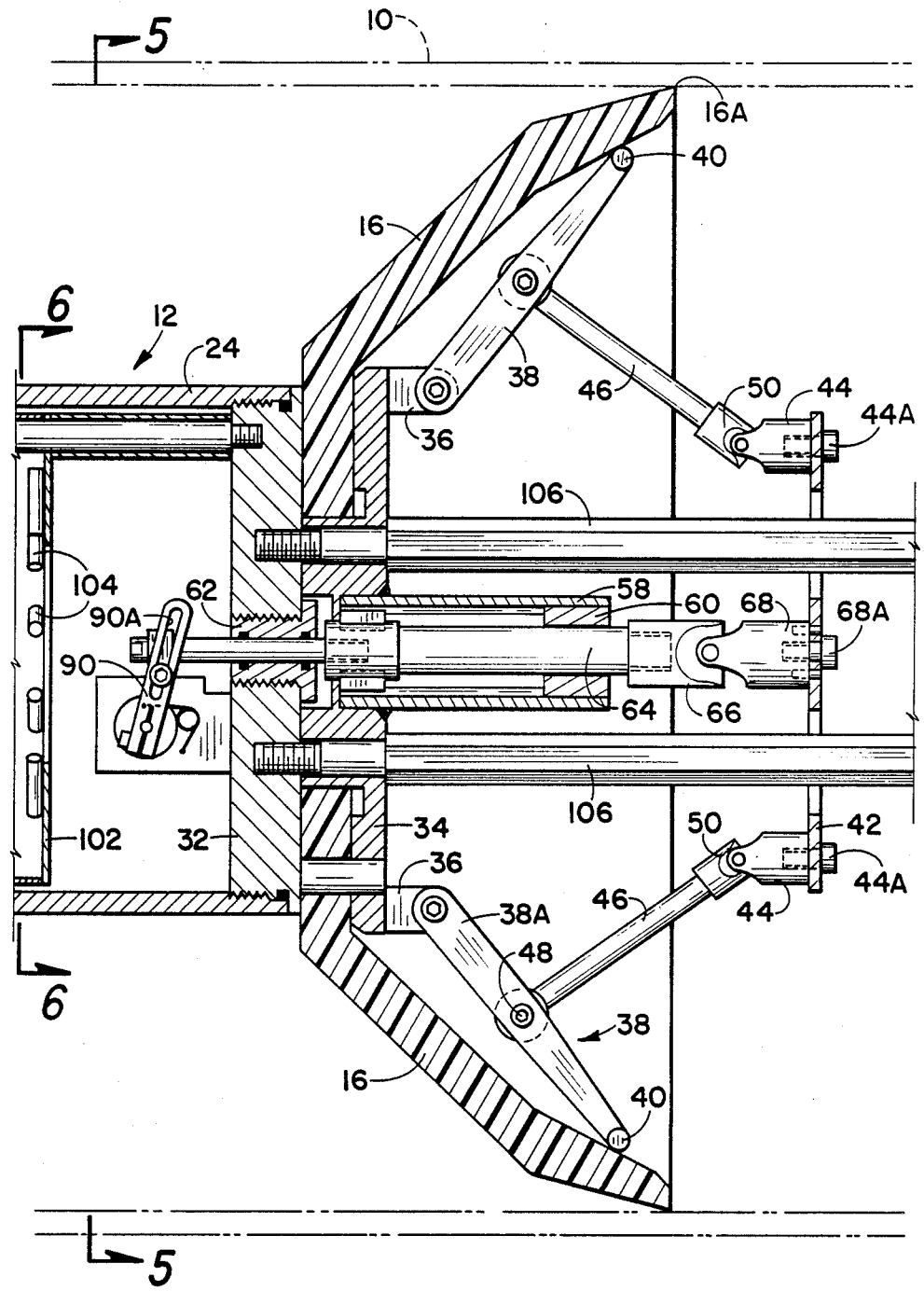
FIG. 3 is a cross-sectional view taken along the line 3—3 of FIG. 2 and showing more details of the means by which internal deviations in the interior wall of a pipeline are converted into electrical signals.
Figure 4:
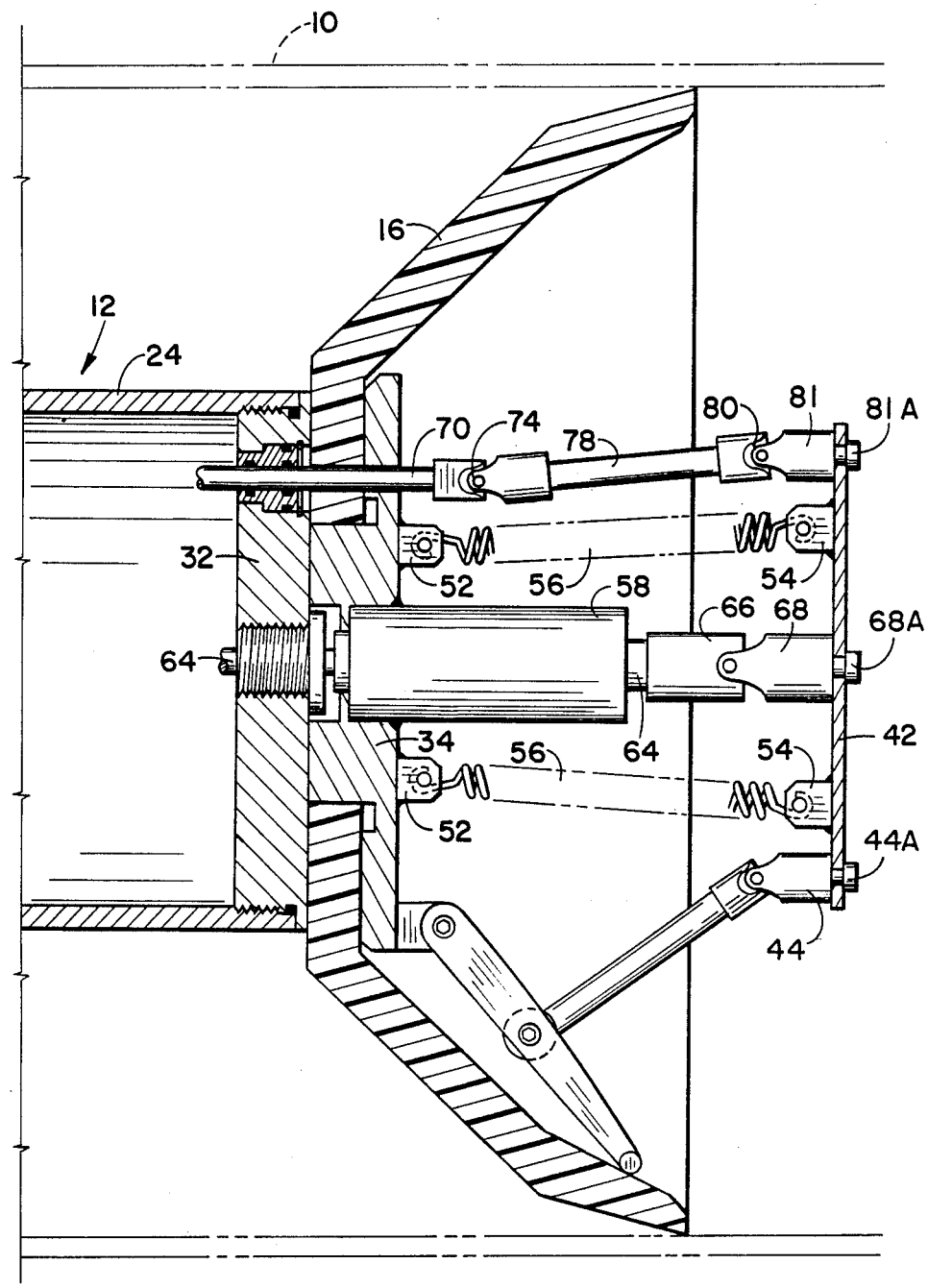
FIG. 4 is a cross-sectional view taken along the line 4—4 of FIG. 2 showing essentially the same mechanisms as is revealed in FIG. 3 but from a slightly different orientation.

Referring to FIGS. 2, 3 and 4 more details of the improved caliper pig are shown. The pig body assembly includes an inner rear plate 32 which sealably receives the housing 24. Attached to the rearward surface of the inner plate 32 is an outer rear plate 34. The rearward cup 16 is secured between plates 32 and 34. The rearward cup extends out to a peripheral edge 16A which engages the interior wall of the pipeline 10 and responds to changes in the configuration of the pipeline interior wall, such as dents, buckles, bulges, branch openings, debris, etc.

Affixed to the rearward surface of the outer rear plate 34 are boss members 36, each of which pivotally receives the inner end of a finger element 38. As is seen in FIG. 2 each of the finger elements 38 is formed of parallel portions and each has at the outer end a short length transverse member 40.

FIG. 2 shows in detail only two of the finger mechanisms 38, it being understood that in the embodiment shown twelve are employed, spaced 30° apart. A greater or a smaller number may be used, depending somewhat on the diameter of cup 16 which, of course, is determined by the size of the pipeline in which the pig is to be used. Whether an odd or even number of finger mechanisms 38 are employed is irrelevant.

Supported rearwardly of the outer rear plate 34 is an integrator plate 42. Attached to the integrator plate forward surface is a short stub shaft 44 for each of the fingers 38. A linkage 46 pivotally connects each finger 38 with a stub shaft 44. The inner end of each linkage is pivoted around a bolt 48 to a mid-point on each of the fingers 38. At the opposite end of each linkage 46 is pivot connection 50 by which each linkage is connected to a stub shaft 44.

Four brackets 52 are affixed to the rearward surface of the outer rear plate 34 and in like manner four brackets 54 are affixed to the forward surface of the integrator plate 42. Extending between brackets 52 and 54 are four coiled springs 56 which urge the integrator plate towards the pig body assembly and thereby, through linkages 46, urge the fingers 38 outwardly against the interior of rearward cup 16. Thus, the position of the integrator plate 42 is determined by the cup 16. As the pig travels through a pipeline the external peripheral edge of the cup conforms to the interior configuration of the pipeline and as it changes contour this change is transmitted through the fingers 38 and linkages 46 to integrator plate 42.

Figure 5:
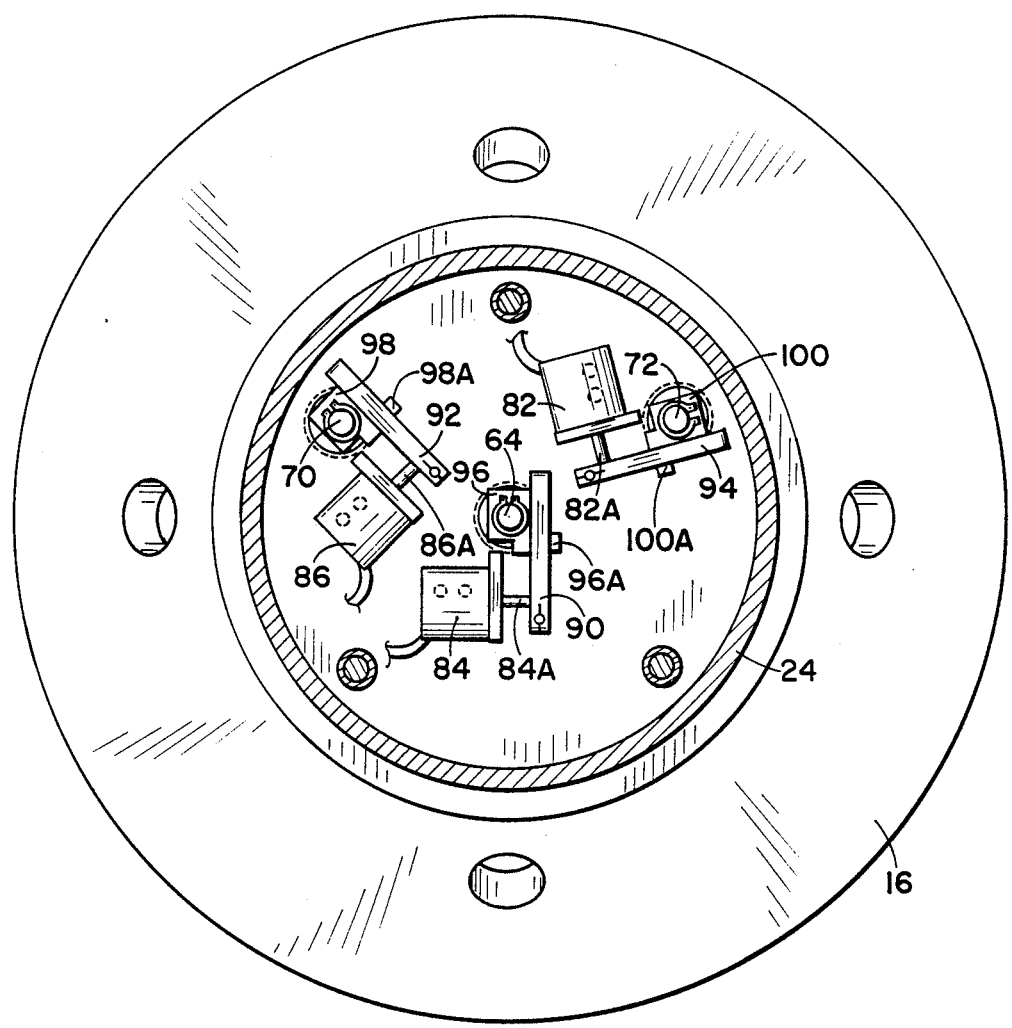
FIG. 5 is a cross-sectional view taken along the line 5—5 of FIG. 3, the view being taken through the body assembly and looking rearwardly towards the rearward cup.

Secured to the outer rear plate 34 is a tubular member 58 having an interior bushing 60 in the outer end. Threadably positioned in the inner rear plate 32 is another bushing 62. Slidably received in bushings 60 and 62 is a central shaft 64. At the rearward end of the central shaft is a universal coupling 66 connected to a stub shaft 68 affixed to the integrator plate rearward surface by a bolt 68A. Bushing 62 has seals therein so that the central shaft 64 may be axially displaced while maintaining the interior of housing 24 free from the liquids or gases contained in pipeline 10. Extending sealably through rear plates 32 and 34 are two peripheral shafts 70 and 72 (See FIGS. 4 and 5), each of which is parallel to the central shaft 64. At the rearward end of each peripheral shaft 70 and 72 is a universal coupling 74 connecting to an extension shaft 78. At the outer end of each extension shaft 78 is a second coupling 80. By means of stub shafts 82 the couplings 81 are connected to the forward surface of the integrator plate 42 adjacent the periphery thereof. (Only one of each of items 74, 78, 80 and 81 are seen). Each of the stub shafts 81 is held in place by bolt 81A. The peripheral shafts 70 and 72 are preferably spaced apart from each other 120° in a plane taken perpendicular the longitudinal axis of the pig body assembly 12 which is coincident with the axis of central shaft 64.

The function of central shaft 64 and peripheral shafts 70 and 72 is to provide a means for axial oriented detection of the movement of integrator plate 42 which in turn is responsive to deflections in the rearward cup 16.

Within housing 24 and forwardly of the inner rear plate 32 are three electrical transducer elements 82, 84 and 86 associated respectively with central shaft 64 and peripheral shafts 70 and 72. (See FIGS. 3 and 5.) Each of the transducer elements has a rotary shaft extending therefrom indicated by the numerals 82A, 84A and 86A. Affixed to rotary shaft 84A is arm 90, to rotary shaft 86A is arm 92 and to rotary shaft 82A is arm 94. As shown in FIG. 3, arm 90 (which is typically also of arms 92 and 94) has a slot therein indicated by 90A. Affixed to central shaft 64 is a block 96 having a pin 96A extending therefrom, the pin being received in the slot 90A of the arm 90. In like manner, blocks 98 and 100 are affixed respectively to peripheral shafts 70 and 72 with pins 98A and 100A extending therefrom. Thus, the displacement of the integrator plate 42 displaces central shaft 64 and peripheral shafts 70 and 72 and this displacement is transmitted to arms 90, 92 and 94 and thereby to the transducer elements 82, 84 and 86. The transducer elements 82, 84 and 86 may be such as potentiometers providing a variable resistance in response to the position of rotary shafts 82A, 84A, and 86A, which in turn is indicative of the attitude of the integrator plate. Thus, means is provided to transform the position of the periphery of cup 16 into electrical signals. By the use of analog-to-digital converters in the electronic package 20 the signals from the transducer elements 82, 84 and 86 are converted into digital signals. By the use of the three shafts 64, 70 and 72 the electrical signals provide indications not only of the extent of deflection of the cup but also the rotational position of the deflection relative to the pig body assembly.

Figure 6:
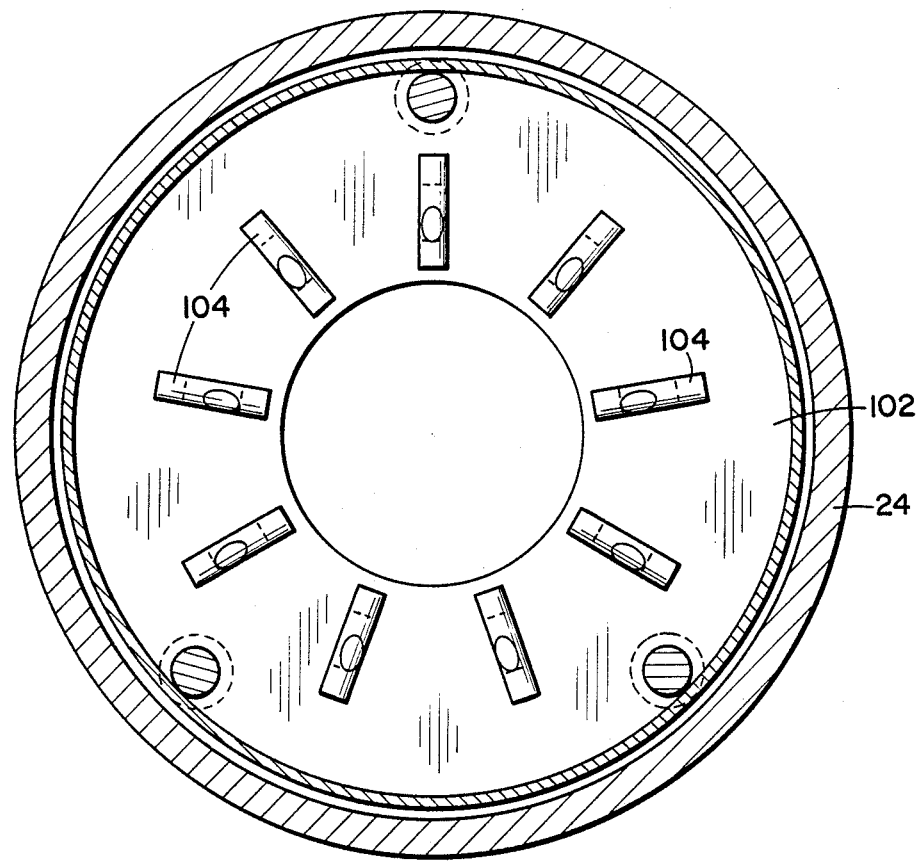
FIG. 6 is a cross-sectional view taken along the line 6—6 of FIG. 3 showing more details of a mechanism for providing axial orientation signals so that the position of the occurrence of an anomoly in the pipeline relative to the vertical can be determined from the record provided by a completed caliper pig run.

Means for axially oriented detection of the movement of the integrator plate 42 relative to the pig body assembly is achieved by the use of the three shafts and three transducers. However, the caliper pig may, and in fact experience with other types of pipeline pigs indicate that it will assuredly tend to rotate out of a preselected orientation relative to the vertical as it travels through a pipeline. The means for axial oriented detection of anomolies in the pipe wall relative to the pig body assembly, as heretofore described, will not tell an operator reviewing a read out obtained from the recorded signals where such anomoly occurs in the pipeline relative to the vertical. Since this information is important to a pipeline operator, the present invention provides means of supplying this information. Positioned within housing 24, as best seen in FIGS. 3 and 6, is an orientation card generally indicated by the numeral 102. Mounted on the orientation card are a plurality of mercury switches 104, nine being shown. Each of the mercury switches includes a small, non-conductive tube, such as of glass or plastic, and a pool of mercury in each tube which responds to gravity. As each switch is tilted mercury flows toward one end or other of the tube and by means of conductors within the tube the pool of mercury provides ON-OFF indication of its location; that is, an indication of the tilt of each switch is provided. By means of conductors (not shown) extending from the mercury switches 104 to the electronic package 20 signals provide an indication of the orientation of the pig body assembly relative to the vertical.

By utilization of an odd number of equal angularly spaced mercury switches as shown in FIG. 6, rather than an even number, the treatment of the switch locations to indicate orientation relative to the vertical is more easily accomplished since in all instances there will be an uneven number of switches in opposite positions, that is, as in the orientation of FIG. 6, five switches have the mercury pool towards the inner end of the switch and four have the mercury pool towards the outer end of the switch. The mercury switches are oriented 40° apart, however, since there is an odd number, a change in orientation of 20° will produce a change in the combination of the switch positions. Thus, the orientation signaling system of the type represented by FIG. 6 is accurate within 20° of the orientation of the pipeline pig relative to vertical. By use of an odd number of equal ansularly spaced apart switches the orientation resolution of the system is significantly improved which would be achieved if an even number was used only by greatly increasing the number of switches.

In order to provide a pipeline operator with a meaningful report as a result of the run of the caliper pig through a pipeline, the position in the pipeline where anomolies occur must be accurately revealed by the finished record. For this reason an odometer system is employed. As shown in FIGS. 1 and 3, extending rearwardly from the rear plates 32 and 34 are four rods 106. As seen in FIG. 2, the integrator plate 42 has large openings 108 therein which permit the rods 106 to pass through without interfering with the movement of the integrator plate. Supported at the rearward end of the rods 106 is a subframe plate 26 as previously identified. Extending rearwardly from the subframe plate 26 are two brackets 110 (See FIGS. 1, 7 and 8) which support a pin 112 therebetween. A hinge member 114 is received on the pin 102 and is free to pivot about the pin. The hinge member 114 has a plate 116 extending from it. Two arms 118 and 120 are pivoted to plate 116 about a bolt 122. At the outer end of each of the arms 118 and 120 is an odometer wheel 124 and 126, respectively. The odometer wheels 124 and 126 engage the interior of pipe 10 on opposite internal circumferential surfaces thereof so that as the caliper pig travels through a pipeline the wheels 124 and 126 accurately measure the distance traveled.

To detect the revolution of odometer wheels 124 and 126 each is provided with a magnet 128. Supported on the arms 118 and 120 are magnet sensitive switches 130, such as reed switches, so that each time a magnet 128 passes a switch 130, the switch momentarily closes (or opens) providing a signal which is fed by conductors 132 to the electronic package 20. This type of odometer wheel signal generation is disclosed in U.S. Pat. No. 3,732,625 entitled "Pipeline Pig", issued May 15, 1973.

The use of two odometer wheels provides a redundancy check to achieve an improved distance measurement employing a method as revealed in U.S. Pat. No. 3,862,497.

By means of springs 134 the arms 118 and 120 are urged outwardly to maintain the odometer wheels 124 and 126 in firm engagement with the interior wall of the pipeline. The method of mounting the odometer wheels by use of a hinge 114 causes them to be self-centering with respect to the interior of the pipeline and to thereby accurately position themselves to engage opposite points on the interior surface of the pipeline so that the odometer wheels are less likely to slip or otherwise provide an inaccurate distance measurement.

When a pipeline has been traversed by the caliper pig of the type disclosed, a record is recorded in the electronic package 120, preferably in the form of digital signals stored in solid state memory chips. When a run is completed the operator removes the pig from the pipeline and removes housing 124, exposing the electronic package. By means of cable connectors (not shown) communication can readily be established with the electronic package and the stored record extracted from memory. The stored record can then be treated by read-out equipment which can be, by example, in the form of a mini-computer or personal computer. The results of the caliper pig run can be studied immediately after the run by mobile equipment on site and thereafter the signals can be more meticulously analyzed to provide more detail of the results of the run by more elaborate computer equipment located in an office especially equipped for detailed analysis of the record.

Figure 8:
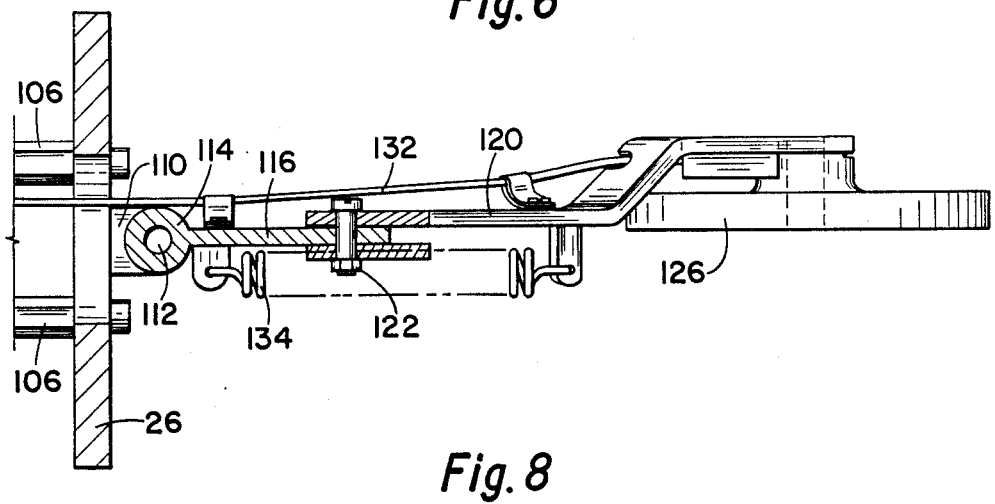
FIG. 8 is a cross-sectional view taken along line 8—8 of FIG. 7 and showing further details of the odometer wheel arrangement.
Figure 7:
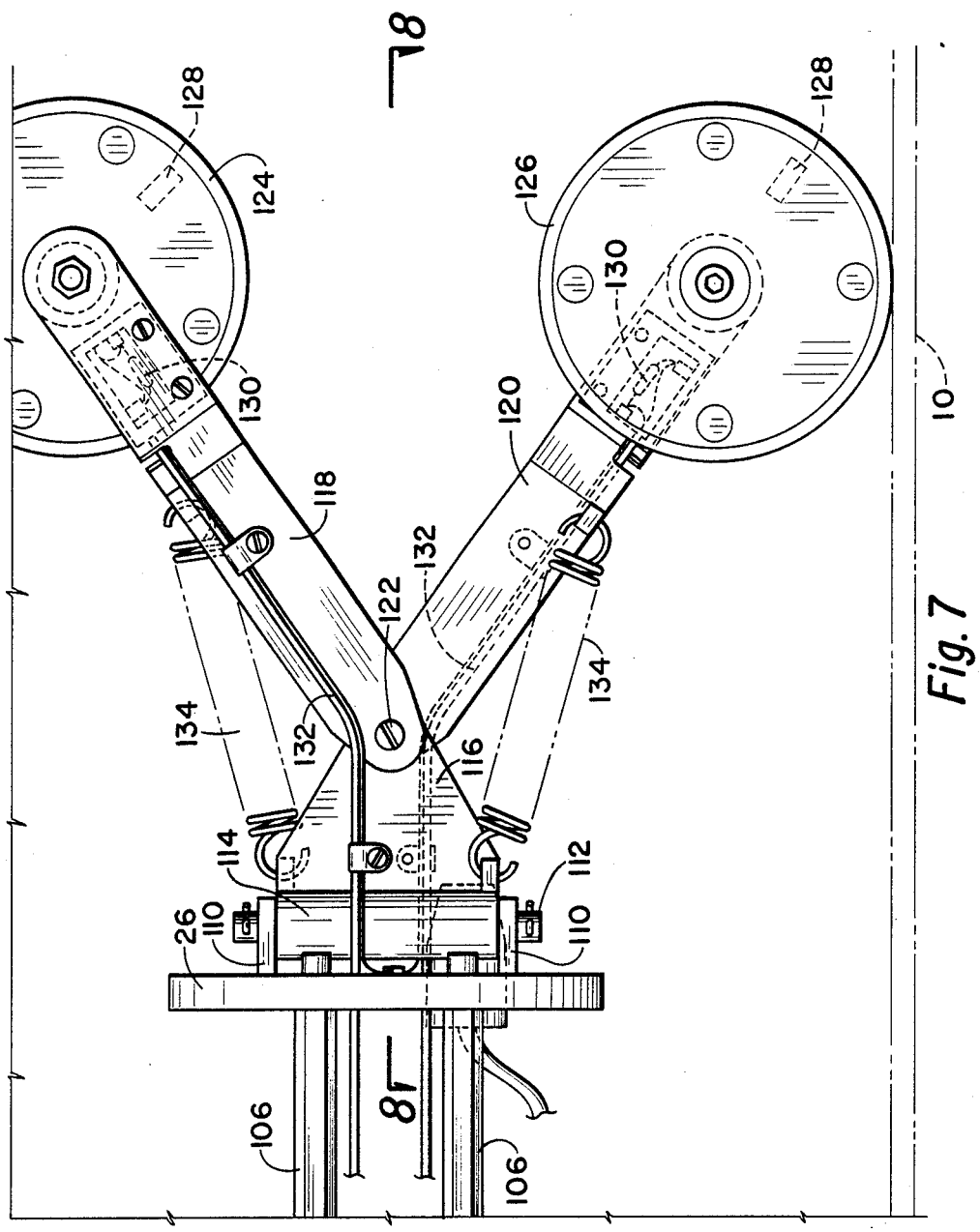
FIG. 7 is an enlarged fragmentary view of the rearward portion of the improved caliper pig showing one means of mounting the odometer wheels as utilized to provide distance measurement signals.
Figure 9:
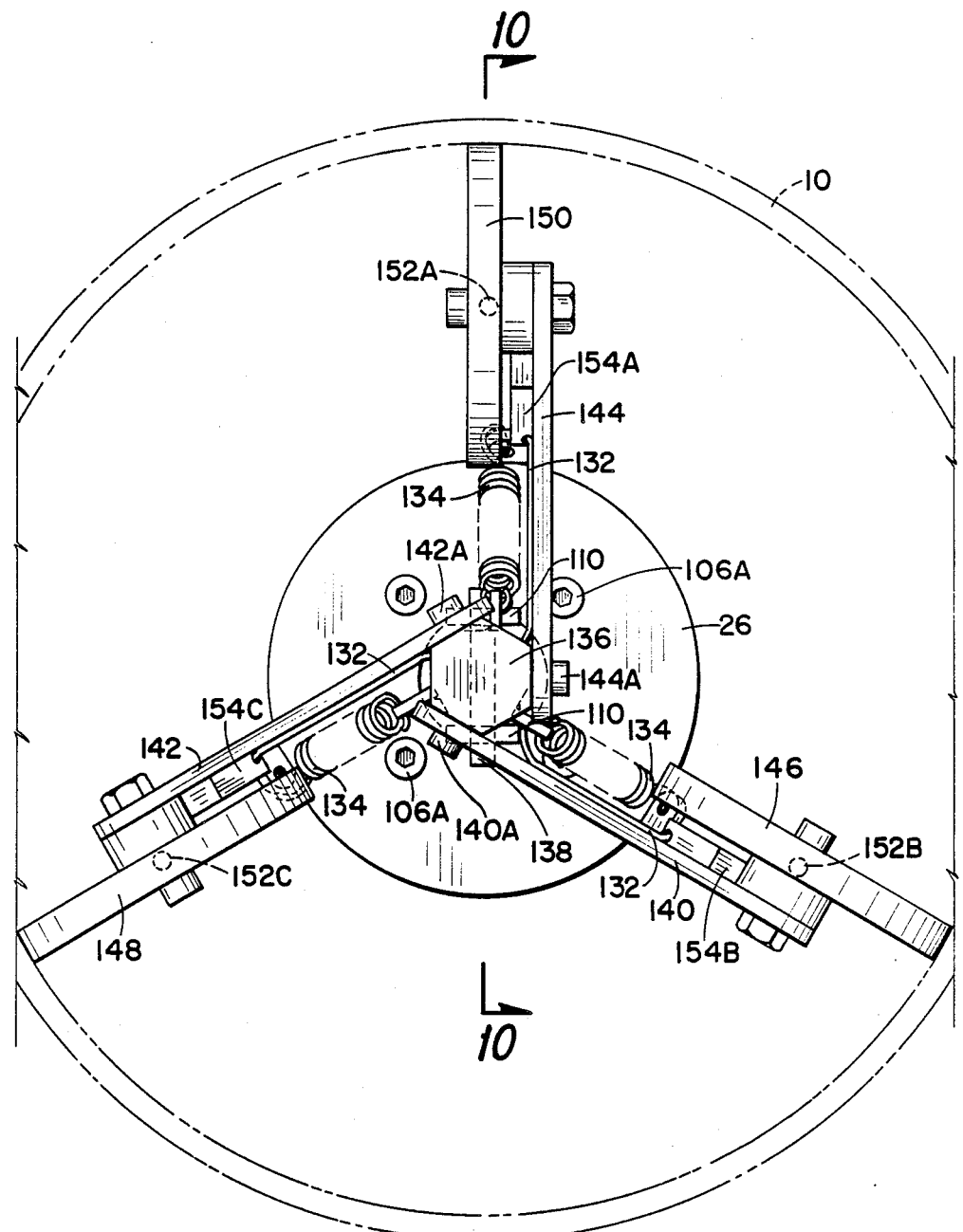
FIG. 9 is an elevational end view of the caliper pig showing an alternate embodiment employing three odometer wheels and providing means of detecting a bend or curve in the pipeline being traversed by the pig.
Figure 10:
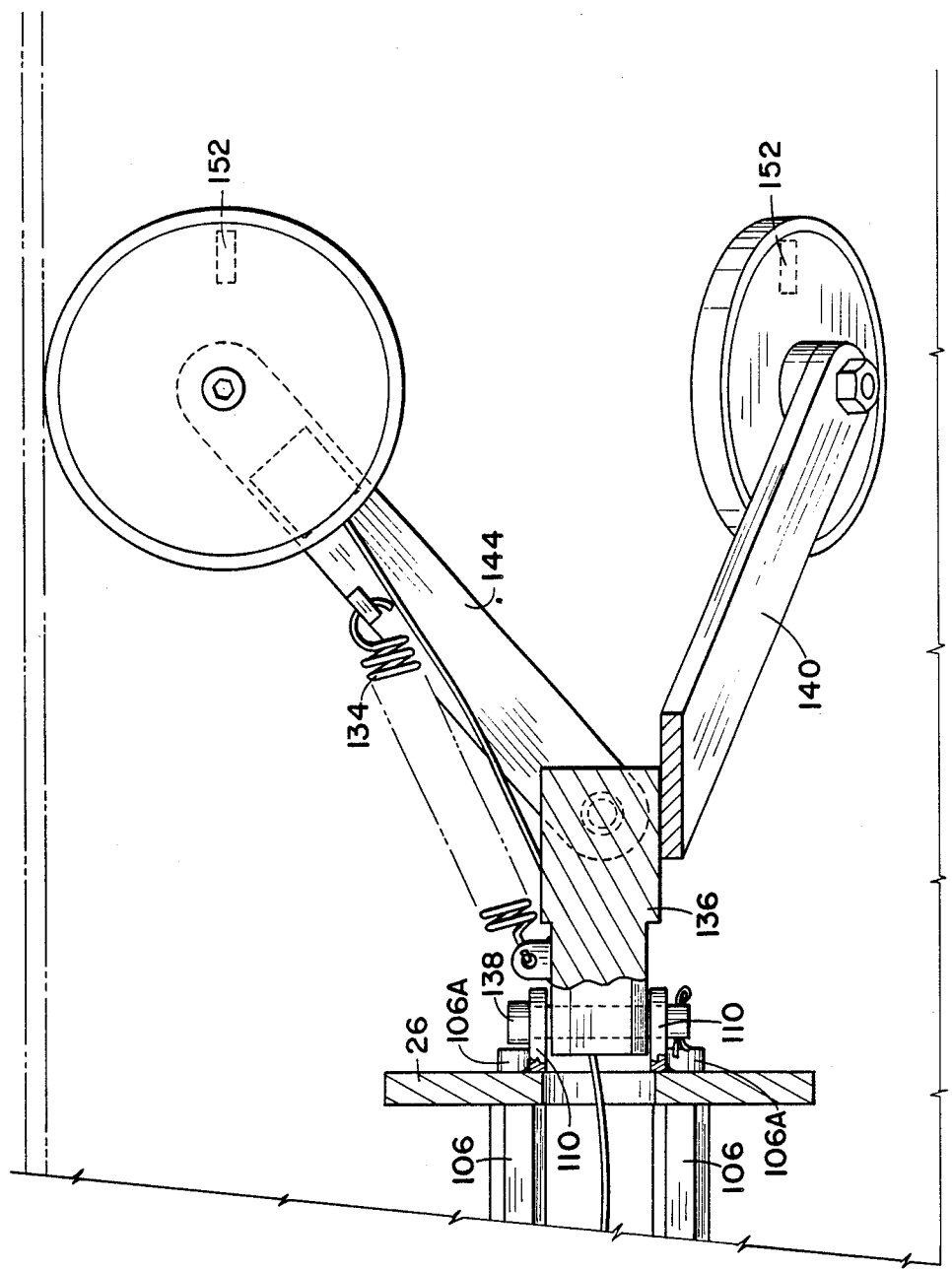
FIG. 10 is a fragmentary cross-sectional view of the rear portion of the alternate embodiment of the caliper pig taken along the line 10—10 of FIG. 9.

Referring to FIGS. 9 and 10 an alternate embodiment of the invention is shown which particularly adapts the pipeline caliper pig to detect bends and curves in a pipeline. FIGS. 7 and 8, which have been previously described, show the use of a dual wheel odometer system providing apparatus to take advantage of the concept of the use of the dual wheel odometer U.S. Pat. No. 3,862,497 previously mentioned. FIGS. 9 and 10 show the employment of three odometer wheels. Pivotally affixed to subframe plate 26, and specifically to brackets 110 extending therefrom, is a hinge member 136 which, at its rearward portion, is hexagonal in cross-sectional configuration, the hinge member being pivotally supported by a pin 138.

Pivotally extending from the hinge member 136 are three arms 140, 142 and 144, each pivoted at its inner end about bolts 140A, 142A and 144A, respectively. At the outer end of the arms are odometer wheels 146, 148 and 150. Springs 134 perform the same function as with reference to FIGS. 7 and 8, that is, they hold the odometer wheels out firmly and yet yieldingly against the interior wall of the pipe line 10. Each of the odometer wheels include means of providing an electrical signal in proportion to the rotation thereof. One means of accomplishing this is as set forth in U.S. Pat. No. 3,732,625 wherein each odometer wheel includes a magnet therein identified by the numbers 152A, 152B and 152C. Rather than being mounted within each of the odometer wheels the magnets may be mounted on the wheels' sidewalls.

Affixed to each of the arms is a rotational sensor which may be such as in the form of a magnet sensitive switch, such as a reed switch, the same being located within instrument packages 154A, 154B and 154C. Once each revolution of each of the wheels 146, 148 and 150, or more often if a greater number of magnets is employed on each wheel, an electrical signal is sent by conductors 132 to the instrument package 20 as shown in FIG. 1.

The odometer wheels, if of the same diameter, will rotate at a different rate when the caliper pig is traveling in a bend or curve in a pipeline and the signals generated and stored in the electronic package 20 in this manner. By means of a proper computer program the stored data can be read out and analyzed and the completed record can provide information as to the location of curves and bends in the pipeline. Alternatively, the signals emanating from the three odometer wheels may be treated by electronics in package 20 by a self-contained program before the signals are stored in memory for later retrieval.

The wheels 146, 148 and 150, in addition to their use for indicating curves and bends, simultaneously function to provide signals employing the principal of U.S. Pat. Nos. 3,732,625 and 3,862,497 to provide information as to distance the pig has traveled from the start of a run in a pipeline. If the pig passes an opening in the side of the pipeline, such as a branch fitting, valve opening or the like, so that one or more of the wheels momentarily do not engage the interior wall of the pipeline, the speed of the rotation of the non-engaging wheel will be reflective of such event and provide further information for use in correlation of the location of the pig at specific instances within the pipeline.

It can be seen that instead of three wheels as in FIGS. 9 and 10, the principle of the invention can be employed using four, five or more wheels, three being the minimum number necessary to provide signal information of the traverse of the caliper pig through a pipeline bend or curve.

The detected bends or curves in a pipeline may be in a horizontal plane or in a vertical plane, or a combination of both. Curves in a vertical plane indicate change in elevation, such as when a pipeline turns upwardly to pass over a hill, or downwardly to pass through a valley or under a river. Thus, the indications obtained as to bends and curves, when combined with indications as to the orientation of the pig body assembly relative to the vertical, provide valuable information which is particularly useful in correlation with odometer measurements, enabling detected anomolies in the pipeline interior wall to be pinpointed accurately as to location.

The information obtained by a run of a pig of the present invention through a pipeline can be analyzed, using an appropriate computer program to produce displays on a video tube or printed information, either numeric or graphic. The information derived by the system represented by FIGS. 9 and 10 combined with the means of simultaneously recording the orientation of the caliper pig relative to the vertical such as by utilizing the concepts of FIG. 6, in conjunction with the response of the pig to deviations in the interior wall of the pipeline as illustrated in FIGS. 1 through 5 and 6 provides a highly complete catalog of the interior of a pipeline as the caliper pig travels from a point of entry to a point of exit.

While the invention has been described with a certain degree of particularly it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved pipeline caliper pig for providing indications of the deviations of an inner wall of a pipeline from a nominal cross-sectional configuration, comprising:
    a pig body assembly having a longitudinal axis and means for supporting the pig body assembly in a pipeline and for impeding the flow of fluid therepast so that the pig body is propelled by such fluid along the pipeline;
    an integrator plate carried by said pig body assembly;
    means for deflecting said integrator plate in response to deviations in the internal pipeline wall;
    means for axial oriented detection of the deflection of said integrator plate and for recording the detected deflections; and
    means for simultaneously determining and recording the orientation of said pig body assembly about its longitudinal axis relative to the vertical whereby the axial orientation of detected deviations is determinable.

2. An improved pipeline caliper pig according to claim 1 wherein said means for determining the orientation of said pig body assembly about its longitudinal axis relative to the vertical includes a plurality of gravity sensitive switch means arranged in spaced angular relationship about said pig body assembly longitudinal axis.

3. An improved pipeline caliper pig according to claim 1 wherein said means for deflecting said plate in response to deviations in the internal pipeline wall includes:
    elastomeric means having engagement with the internal pipeline wall; and
    means coupling the deflection of said elastomeric means to said integrator plate.

4. An improved pipeline caliper pig according to claim 3 wherein said means coupling the deflection of said elastomeric means to said integrator plate includes:
    a plurality of spaced apart finger means each hinged at one end to said pig body assembly; and
    linkage means from each of said finger means to said plate.

5. An improved pipeline caliper pig according to claim 1 wherein said means for axial oriented detection of the deflection of said integrator plate includes:
    a plurality of three or more movement detector means affixed to said integrator plate at spaced apart points, at least two of which are located away from the plate center of pivotation.

6. An improved pipeline caliper pig according to claim 5 wherein one of said points of movement detector means attached to said integrator plate includes an axially displaceable central shaft, one end of which is secured to said plate by universal coupling means; and
    means to detect the axial displacement of said central shaft.

7. An improved pipeline caliper pig according to claim 5 wherein said movement detector means are in the form of axially displaceable shafts; and including
    means to detect the axial displacement of each of said shafts.

8. An improved pipeline pig according to claim 7 wherein one of said axially displaceable shafts is a central shaft, and there being at least two spaced apart peripheral shafts spaced from said central shaft;
    coupling means attaching one end of each of said peripheral shafts to said plate at points spaced from said central shaft; and
    means to detect the axial displacement of each of said shafts.

9. An improved pipeline caliper pig according to claim 7 wherein said means to detect the axial displacement of each shaft includes:
    an electrical transducer means mounted on said body assembly for association with each of said shafts, each electrical transducer means having a rotatable member extending therefrom, the rotational axis of each such member being perpendicular to a plane of the axis of said shaft with which it is associated;
    a crank arm affixed to each of said members extending from said electrical transducer means; and
    means coupling each of said shafts to said crank arm of said electrical transducer means associated therewith whereby the axial displacement of each of said shafts causes the rotation of said electrical transducer means rotatable member associated therewith.

10. An improved pipeline caliper pig according to claim 9 wherein each of said electrical transducer means is in the form of a potentiometer.

11. An improved pipeline caliper pig according to claim 1 including:

means to detect the traverse of said pig body assembly of a curve or bend in a pipeline and to provide electrical signals in response thereto.

12. An improved pipeline caliper pig according to claim 11 including:

means to simultaneously record electrical signals (a) in response to the traverse of the pig body assembly of a curve or bend in a pipeline and (b) in response to the orientation of said body assembly about its longitudinal axis relative to the vertical whereby the direction of detected curves and bends relative to the vertical can be determined from said recorded electrical signals.

13. An improved pipeline caliper pig according to claim 11 wherein said means to detect the traverse of said pig body assembly of a curve or bend in a pipeline and to provide electrical signals in response thereto includes:

a plurality of at least three odometer wheels extending from said pig body assembly and oriented in spaced apart angular relationship in a plane normal to said body assembly longitudinal axis, the wheels being arranged to engage the interior pipeline wall and to roll against the pipeline wall as the pig body assembly traverses the interior of a pipeline; and means to generate electrical signals in response to the rotation of said odometer wheels.

14. An instrument pig for traversing the interior of a pipeline having means to detect changes of direction of the pipeline, such as curves, dips and rises, comprising:

a pig body assembly having a longitudinal axis and means for supporting the body in a pipeline and for causing the movement of the pig body assembly to move in the pipeline in the direction of its longitudinal axis;

a plurality of at least three odometer wheels extending from said pig body assembly and oriented in spaced angular relationship in a plane normal to said body assembly longitudinal axis, the wheels being arranged to engage the interior pipeline wall and to roll against the pipeline wall as the pig body assembly traverses the interior of a pipeline;

means to generate electrical signals in response to the rotation of each of said odometer wheels;

means for simultaneously providing electrical signals indicative of the orientation of said pig body about its longitudinal axis relative to the vertical;

means to store said electrical signals for subsequent retrieval; and wherein said means for determining the orientation of said pig body assembly about its longitudinal axis relative to the vertical includes a plurality of gravity switch means arranged in spaced angular relationship about said pig body assembly longitudinal axis.

15. An improved pipeline caliper pig for providing indications of deviations of an inner wall of a pipeline from a nominal cross-sectional configuration, comprising:

a pig body having a longitudinal axis and means for supporting the body in a pipeline and for impeding the flow of fluid therepast so that the body is propelled by such fluid along the pipeline;

means carried by said body for detecting deviations in the internal wall of a pipeline;

means for determining the angular relationship of detected deviation to said body;

means for converting the detected pipeline wall deviation and the angular relationship thereof to said body into electrical signals;

means to detect the angular relationship of said body relative to the vertical and to convert such detected angular relationship into electrical signals, said means of detecting the angular relationship including a plurality of gravity switch means arranged in spaced angular relationship about said pig body longitudinal axis;

means to measure the traverse of said body in a pipeline and to convert the measured traverse into electrical signals; and means to record all of said electrical signals in time relationship whereby said recorded signals may subsequently be read out.

* * * * *